(12) United States Patent
Franzi

(10) Patent No.: US 11,816,196 B2
(45) Date of Patent: Nov. 14, 2023

(54) METHOD FOR SECURING ACCESS TO A WATCH

(71) Applicant: Tissot SA, Le Locle (CH)

(72) Inventor: Edoardo Franzi, Cheseaux-Noréaz (CH)

(73) Assignee: Tissot SA, Le Locle (CH)

( * ) Notice: Subject to any disclaimer, the term of this patent is extended or adjusted under 35 U.S.C. 154(b) by 122 days.

(21) Appl. No.: 17/094,099

(22) Filed: Nov. 10, 2020

(65) Prior Publication Data

US 2021/0173912 A1 Jun. 10, 2021

(30) Foreign Application Priority Data

Dec. 6, 2019 (EP) ...................... 19214102

(51) Int. Cl.
  *G06F 21/32* (2013.01)
(52) U.S. Cl.
  CPC .................... *G06F 21/32* (2013.01)
(58) Field of Classification Search
  None
  See application file for complete search history.

(56) References Cited

U.S. PATENT DOCUMENTS

| 10,075,846 | B1 | 9/2018 | Acar et al. |
| 2016/0004224 | A1 | 1/2016 | Pi |
| 2017/0017785 | A1 | 1/2017 | Rice et al. |
| 2019/0000370 | A1* | 1/2019 | Boshra ................. A61B 5/0086 |
| 2019/0095602 | A1* | 3/2019 | Setlak .................. G06F 1/1686 |
| 2019/0236330 | A1 | 8/2019 | Miyoshino et al. |

FOREIGN PATENT DOCUMENTS

| EP | 3 287 922 A1 | 2/2018 |
| EP | 3 413 226 A1 | 12/2018 |
| JP | 10-289210 A | 10/1998 |
| JP | 2003-058269 A | 2/2003 |
| JP | 2010-522379 A | 7/2010 |
| JP | 2011-253340 A | 12/2011 |
| JP | 2017-27594 A | 2/2017 |
| WO | 2008/134135 A2 | 11/2008 |
| WO | 2018/079852 A1 | 5/2018 |
| WO | 2019/209587 A1 | 10/2019 |

OTHER PUBLICATIONS

Notice of the Reason for Refusal dated Nov. 2, 2021 from the Japanese Patent Office in JP Application No. 2020-193065.
European Search Report for 19214102 dated Jun. 4, 2020.

* cited by examiner

*Primary Examiner* — Nicholas J Lee
(74) *Attorney, Agent, or Firm* — Sughrue Mion, PLLC

(57) ABSTRACT

A method for securing access to a watch (100) including: authentication (10) of the wearer of the watch (100) with a view to authorising access to the functions of this watch (100) based on an interaction between the wearer of the watch and a graphic representation included in the watch (100), and periodic checking (20) of the identity of the wearer of the watch through a verification of the validity of a digital data item determined based on at least one biometric data item of the wearer of said watch with a view to retaining/removing the authorisation for access to the functions.

17 Claims, 1 Drawing Sheet

METHOD FOR SECURING ACCESS TO A WATCH

CROSS-REFERENCE TO RELATED APPLICATIONS

This application claims priority to European Patent Application No. 19214102.6 filed Dec. 6, 2019, the contents of which are incorporated herein by reference.

TECHNICAL FIELD

The present invention relates to a method for securing access to a watch and a system implementing such a method.

The invention also relates to a watch comprising such a system as well as a computer program.

PRIOR ART

A watch comprises a set of functions which can be used by the wearer. Such functions can relate in addition to setting the time or date, to use of confidential or private data specific to the wearer and useful for accessing customised services. These data are for example keys, certificates, authentication codes, passwords and PINs which are used to connect the watch securely to a private corporate network, authentication with respect to secure servers such as a bank server, or a secure messaging system for sending and receiving signed and/or encrypted emails. As such, it is understood that it is important to be able to secure access to the use of the functions of such a watch.

For this purpose, in the prior art, methods are known envisaging securing access to a watch and in particular to the functions of this watch, by reinforcing the authentication criteria authorising this access for example by implementing additional authentication steps.

However, one of the major drawbacks of such methods is linked with the fact that, once the wearer of the watch is authenticated, it is then possible for any individual to obtain access to the functions of the watch particularly in the event of the latter being stolen.

It is understood that there is a need to find an alternative solution, particularly which does not have the drawbacks of the prior art.

SUMMARY OF THE INVENTION

An aim of the present invention is consequently that of proposing a method for securing access to a watch which is reliable and robust.

Such a method has the advantage of ensuring the identity of the wearer of the watch automatically, transparently and non-intrusively for the wearer.

In this aim, the invention relates to a method for securing access to a watch including the following steps:
  authentication of the wearer of the watch with a view to authorising access to the functions of this watch based on an interaction between the wearer of the watch and a graphic representation comprised in said watch, and
  periodic checking of the identity of the wearer of the watch through a verification of the validity of a digital data item determined based on at least one biometric data item of the wearer of said watch with a view to retaining/removing the authorisation for access to said functions.

In further embodiments:
  the authentication step comprises a presentation sub-step of a graphic representation on a visual data broadcasting interface of said watch;
  the authentication step comprises a selection sub-step within a limited time interval of a sequence of at least two identification portions comprised in said graphic representation aiming to identify said wearer, said sequence corresponding to an identification code of the wearer;
  the authentication step comprises a validation sub-step of the selected sequence;
  the checking step comprises an acquisition sub-step by at least one multispectral biometric skin sensor comprised in the watch, of a plurality of images of a portion of the wearer's skin adjacent to said sensor, said images comprising said at least one biometric data item comprised in this skin portion;
  the checking step comprises a sub-step of generating a digital identification item based on said at least one biometric data item;
  the checking step comprises a sub-step of validating a digital identification item generated in anticipation of the wearer identity check;
  the validation sub-step comprises a comparison phase including a sub-phase of retaining the authorisation to access said functions of the watch if the digital identification item is substantially similar or similar to a reference digital identification item;
  the acquisition sub-step comprises an illumination phase of the skin portion along different wavelengths;
  the acquisition sub-step comprises a capture phase of images of the skin portion illuminated at different wavelengths;
  the generation sub-step comprises a characterisation phase of said at least one biometric data item comprised in the acquired images relative to said skin portion;
  the generation sub-step comprises a design phase of the digital identification item based on the characterisation of said biometric data item;
  the biometric data item relates to a vascular network or to a texture of this skin.

The invention also relates to a system for securing access to a watch implementing this method, the system comprising the following interconnected elements: a processing unit, a biometric sensor, an input interface and a visual data broadcasting interface.

Advantageously, the biometric sensor is a multispectral biometric skin sensor.

The invention also relates to a watch, particularly a connected mechanical watch, including such a system.

The invention also relates to a computer program comprising program code instructions for executing the steps of the method when said program is executed by a processing unit.

BRIEF DESCRIPTION OF THE FIGURES

Further specificities and advantages will emerge clearly from the description given hereinafter, which is by way of indication and in no way limiting, with reference to the appended figures, wherein.

DETAILED DESCRIPTION OF THE INVENTION

Figure 1:
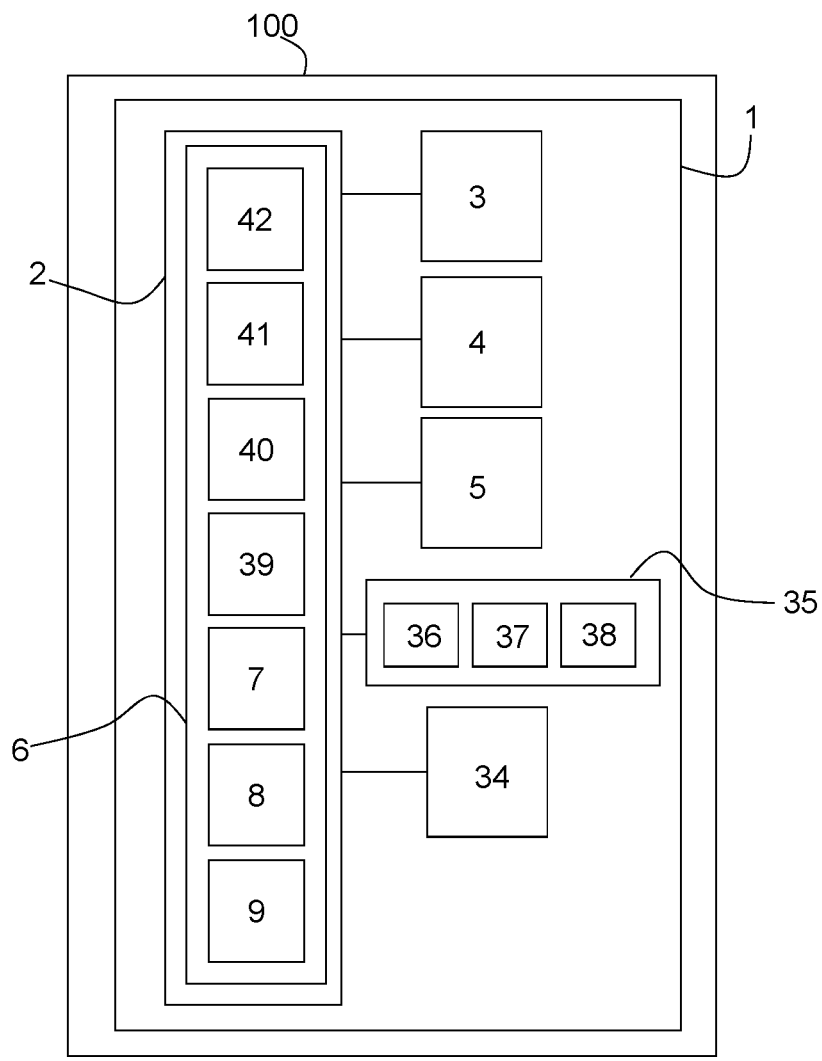
FIG. 1 is a schematic representation of a watch comprising a system for securing access to a watch, according to an embodiment of the invention.

FIG. 1 shows a watch 100 comprising a system for securing access to a watch 100 and in particular to the use of functions of this watch 100. Such a system 1 is comprised in the watch 100 which is preferably a hybrid-display connected mechanical watch 100. In this context, this electronic device 100 comprises a body such as the watch case, and an attachment element such as a bracelet making it possible for this body to be fastened for example to the wearers wrist. This system 1 more specifically comprises in a non-limiting and/or non-exhaustive manner:
- a processing unit 2 including hardware and software resources in particular at least one processor cooperating with memory elements 6;
- a visual data broadcasting interface 3 such as a hybrid display dial provided with a first analogue display component and a second digital and/or alphanumeric display component;
- an audio data broadcasting interface 4 such as a speaker;
- a wireless communication interface 5 (for example cellular, WLAN Bluetooth, etc.);
- an input interface 34 such as a keypad or indeed a touch-sensitive interface comprised for example in the visual data broadcasting interface 3, and
- a biometric sensor 35 particularly in this embodiment a multispectral skin sensor, said sensor 35 comprising at least one photographic sensor 36, at least one multispectral light source 37 and at least one thermal image sensor 38, the light source 37 being capable of emitting luminous radiation in wavelengths between 300 and 1100 nm, furthermore, this light source 37 can be of the laser type.

In this system 1, the processing unit 2 is connected inter alia to the visual and audio data broadcasting interfaces 3, 4, to the input interface 34 as well as to the wireless communication interface 5 and to the biometric sensor 35. It will be noted additionally that the biometric sensor 35 is arranged in the body of the electronic device 100 and/or in the attachment element.

This system 1 implemented in the electronic device 100 is capable of checking the identity of the authenticated wearer of the watch discreetly without direct intervention/interaction of the wearer with this watch 100, so that they can use the functions of the watch 100 all the time that they are wearing it, without having to undergo authentication again. The wearer is then identified transparently and discreetly, based on at least one biometric data item. Within the scope of the present embodiment, the biometric data item is comprised in a portion of the wearer's skin and can be a vascular network of the skin or indeed a texture of this skin. This skin of the wearer covering their body has a specificity, less obvious for those skilled in the art to envisage as not naturally seen by the human eye, linked with the absorption and reflection characteristics at different wavelengths (spectrum) of the components of the skin, located at different depths. In a simplified model, the skin consists of a semi-transparent layer known as the "epidermis" located on the surface then, below the epidermis, a layer known as the "dermis" and comprising, inter alia, the blood vessels (or vascular network) wherein haemoglobin is highly reflective at high wavelengths near red being comprised for example between 760 and 930 nm which makes it possible herein to reveal or detect the vascular network of the wearer's skin. In other words, the light absorption spectrum of the components of the epidermis and the dermis forming the skin not being uniform along electromagnetic wavelengths, the appearance and colour of the skin are the result of a complex combination of these phenomena. Thus, when it is necessary to detect or reveal a biometric data item such as the skin texture of this wearer, a texture essentially formed of cracks and cavities, the skin can then be illuminated by a light source restricted to the wavelengths around red which tends to make the shadow phenomenon at the bottom of cracks disappear. Indeed, a retroprojection effect occurs by reflecting these near-red wavelengths onto the dermis and through the epidermis, whereas illuminating the skin by a source of a colorimetric spectrum at a distance from red, typically the band of wavelengths located between violet (400 nm) and up to orangey yellow (600 nm), makes it possible on the other hand to contrast these skin cracks significantly through the appearance of shadows at the bottom of these cracks. It will be noted that the identification of a biometric data item comprised in the skin can be enhanced using the thermal image sensor 38 preferably without illumination. By way of example, for the detection of the skin texture particularly when the portion of this wearer's skin concerned is endowed with hairs, the use of the thermal image sensor 38 makes it possible to reveal the cracks of this skin texture which are generally warmer than the surrounding skin and the hairs colder than this surrounding skin. Thus, in this configuration, the hairs can be distinguished thermally from the cracks of the skin texture due to this difference between the respective temperature thereof.

It will be noted that the thermal images can be captured under illumination in a given wavelength according to the biometric data item to be detected or revealed.

It is therefore understood, according to the principle of the invention, that the periodic identification of the wearer is carried out based on at least one biometric data item comprised in images of a portion of this wearers skin which can be illuminated where applicable along different wavelengths in order to capture the images comprising the biometric data item sought. Thus, this biometric data item, comprised in these images, can be detected by the illumination performed in different wavelengths or without illumination for example when capturing thermal images is involved.

In this system 1, the memory elements 6 of the processing unit 2 comprise data relating to a previously defined/generated reference digital identification item. These memory elements 6 also include digital image processing algorithms 39 making it possible to characterise at least one biometric data item relating to the wearers skin and which is comprised in the images relative to the portion of the wearers skin. These memory elements 6 also include generation algorithms 40 of the reference digital identification item but also of the digital identification item which is generated periodically within the scope of the wearer's identity check.

These memory elements 6 of the processing unit 2 also comprise at least one graphic representation 41 envisaged to take part in the authentication process of the wearer so that the latter has access to the functions of the watch 100. This graphic representation 41 can for example be an image comprising at least one object. By way of example, this image defines a scene comprising a plurality of objects such as houses, vehicles and/or a celestial body such as the moon, etc. It is obviously understood that this image can define further types of scene including at least one object. These memory elements 6 also include data relating to a reference sequence 42 comprising reference identification portions of this graphic representation 41, said portions having been previously selected by the wearer of the watch during the configuration of an authentication process.

Figure 2:
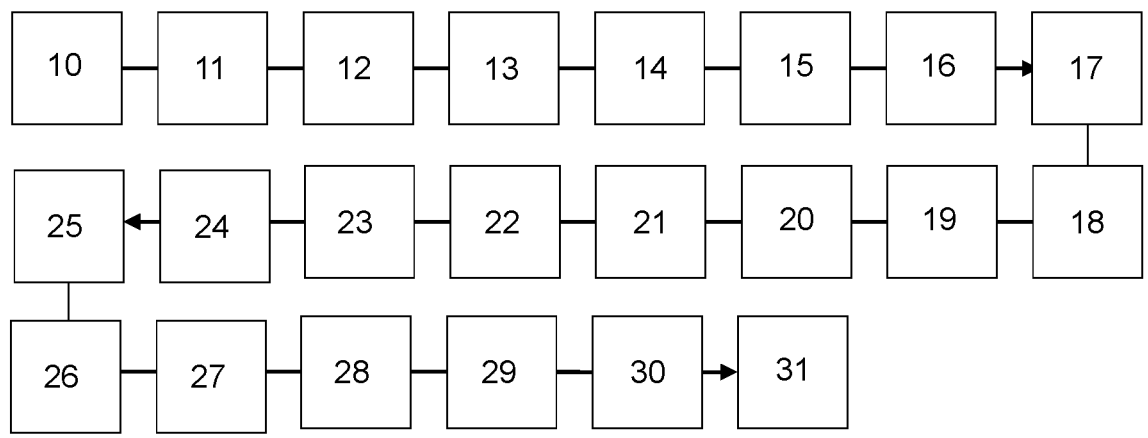
FIG. 2 is a logic diagram relating to a method for securing access to a watch, according to the embodiment of the invention.

Such a system 1 of the watch 100 is capable of implementing a method for securing access to the watch 100 and in particular to the use of functions of this watch 100, represented in FIG. 2. Such a method aims to check the identify of an authenticated user discreetly, i.e. non-intrusively and automatically, so that they can use the functions of the watch 100 all the time that they are wearing it, without having to undergo authentication again. The functions of the watch 100 can relate to setting the time, date, or indeed using a timer, a navigation system, a pedometer, an activity logger, a messaging system, access to confidential or private data specific to the wearer and useful for accessing customised services, etc.

This method comprises an authentication step 10 of the wearer of the watch 100 with a view to authorising access to the functions of this watch 100 based on an interaction between the wearer of the watch and a graphic representation comprised in said watch 100 more specifically a graphic representation displayed on/in the visual data broadcasting interface 3 of said watch 100. This step 10 enables the wearer to prove their identity. More specifically, this step 10 comprises a sub-step 11 of presenting a graphic representation 41 on the visual data broadcasting interface 3 of said watch 100. This sub-step 11 includes a display generation phase 12, on/in the visual data broadcasting interface 3, of the graphic representation 41 envisaged for the implementation of this authentication. This phase 12 can comprise a selection sub-phase by the user from a sample of at least two graphic representations 41 displayed on the visual data broadcasting interface 3, of the graphic representation 41 envisaged for the implementation of this authentication. it will be noted that the wearer is the only one to know the graphic representations 41 that they selected during the configuration of the authentication process for access to the functions of the watch 100.

This presentation sub-step 11 then comprises a countdown activation phase 13 once the generation phase 12 is carried out. In other words, the preconfigurable countdown is activated once the graphic representation 41 is presented on the broadcasting interface 3. Such a phase 13 helps from a limited time interval defined by this countdown, to count down the estimated time required for the input of the sequence of identification portions of the graphic representation 41 displayed on/in the broadcasting interface 3.

Subsequently, the authentication step 10 comprises a selection sub-step 14 within a limited time interval of a sequence of at least two identification portions of said graphic representation 41 aiming to identify said wearer, said sequence corresponding to an identification code of the wearer. Such identification portions are not directly visible in the graphic representation 41 presented on/in the broadcasting interface 3. Under these conditions, the selection sub-step 14 comprises a visualisation phase 15 of at least one of said identification portions of the sequence in said graphic representation 41. This visualisation phase 15 comprises a selection sub-phase of at least one zone of interest of the graphic representation 41 suitable for comprising said at least one identification portion. During this sub-phase, the wearer selects for example a first zone of interest or a second zone of interest by making an enlargement of this first zone or this second zone using the input interface 35. Once this first or second zone of interest has been selected, the identification portions then become visible. In this configuration, each identification portion usable for creating/forming the sequence can be selected using the input interface 35.

It should be noted that the sequence comprises an ordered number of identification portions and that the zone of interest selected can comprise for example three identification portions of which merely two are ordered successively one after the other in the sequence. In this context, the remaining identification portion requires to be part of the sequence, the selection of an identification portion comprised in a further zone of interest of the graphic representation 41.

Then, the authentication step 10 comprises a validation sub-step 16 of the selected sequence. This validation sub-step 16 comprises a checking phase 17 that the selection of the sequence of identification portions has been carried out within the time interval defined by the countdown. Insofar as this selection has been carried out within this limited time interval, the validation sub-step 16 then comprises a comparison step 18, implemented by the processing unit 2, between said selected sequence and the reference sequence 42. This comparison phase 18 comprises a sub-phase of prohibiting access to the functions of the watch 100 if said sequence is substantially different or different from the reference sequence 42. Conversely, this comparison phase 18 comprises a sub-phase of authorising access to the functions of the watch 100 if said sequence is substantially similar or similar to the reference sequence 42.

Insofar as this selection has not been carried out within this limited time interval, the validation sub-step 16 comprises a repeating step 19 of the presentation 11 and selection 14 sub-steps. If, subsequently, the selection of the sequence has once again not been carried out within the limited time interval, the validation sub-step 11 then envisages a sub-step of blocking/locking access to the functions of the watch 100. In this context, a specific unlocking/unblocking procedure is then required to restore access to said watch.

This method then comprises a periodic checking step 20 of the identity of the wearer of the watch through a verification of the validity of a digital data item determined based on at least one biometric data item of the wearer of said watch with a view to retaining/removing the authorisation for access to said functions. Such a step is also known as periodic discreet checking step. Within the scope of the present embodiment, the biometric data item is comprised in a portion of the wearer's skin. During this step 20, the period associated with the checking is regular or irregular and can be configured automatically by the processing unit 2 or defined by the wearer. By way of example, this period can be a few seconds or a few minutes. Such a checking step 20 makes it possible to verify following each period that the wearer of the watch is always the same by checking their "biometric" identity based on a digital identification item established according to at least one biometric data item comprised in this wearer's skin.

This checking step 20 then comprises an acquisition sub-step 21 by the sensor 35 of a plurality of images of a portion of the wearers skin, said skin being arranged adjacently to said sensor, said images comprising at least one biometric data item comprised in this skin portion. This sub-step 21 comprises an illumination phase 22 of the skin portion along different wavelengths. More specifically, during this phase 22, the processing unit 2 controls the multispectral biometric sensor 35 and in particular the light source 37 such that the latter emits luminous radiation towards the skin portion along a specific wavelength adapted to detecting or revealing said at least one specific biometric information item of the skin, herein sought within the scope of the wearer identity check, and which is comprised in this portion of the wearers skin. Once the illumination has been configured, the acquisition sub-step 21 comprises a capture phase 23 of images of this skin portion illuminated at at least one wavelength suitable for detecting or revealing said at least one biometric data item. During this phase 23, the processing unit 2 controls the multispectral biometric skin sensor 35 and in particular the photographic sensor 36 synchronously with the activation/deactivation of the light source 37, in order to carry out the capture of at least one image relative to the illuminated skin portion for at least one wavelength.

This acquisition sub-step 21 can also comprise a capture phase 24 of at least one thermal image of the skin portion. Such a phase 24 is carried out preferably without illumination but in further alternatives an illumination of the portion can be performed in at least one given wavelength, this being dependent obviously on the biometric data item to be detected or revealed. This phase 24 can be carried out before or after the illumination 22 and image capture 23 phases.

The checking step 20 then comprises a generation sub-step 25 of the digital identification item based on said at least one biometric data item comprised in the acquired images of the skin portion. Such a sub-step 25 comprises a characterisation phase 26 of said at least one biometric data item comprised in the images relative to said skin portion. During this phase 26, the processing unit 2 implements processing algorithms 39 of the images acquired aiming to identify/detect in each thereof said at least one biometric data item comprised therein. As mentioned above, this can involve data items relating for example to the texture of the skin or to the vascular network comprised in this portion of the wearer's skin. The implementation of these algorithms 39, 40 by the processing unit 2 can for example envisage a segmentation process of these images. It is understood herein that each image acquired gives an overview of the portion of the wearer's skin, and then includes variable relevance zones for the identification of said at least one biometric data item. Such a segmentation process helps extract the segments to be processed and remove the parts not to be processed in these images. These algorithms 39 can then envisage an indexing of these image segments comprising characteristics relating to said at least one specific biometric data item to be identified, by location zones in the skin portion, in order to be able to assign to each zone the suitable processing with respect to the morphological typology of the characteristic of this geographic zone of the portion. In this context, these algorithms 39 process each segment of these images by detecting the data carried by the pixels of each of these images by carrying out processing, transformation and detection type image analysis operations. Subsequently, these algorithms 39 perform characteristic filtering and extraction or vectorisation operations, in order to convert the image data relating to said at least one identified and extracted biometric data item, into parametric data, typically relative numerical values expressed for example as an index or percentage.

It is understood herein that the acquisition of several images representing the same skin portion helps enhance the precision and efficacy of this characterisation phase 26.

Subsequently, the generation sub-step 25 comprises a design phase 27 of the digital identification item based on the characterisation of said at least one biometric data item. During this phase 27, the processing unit 2 implements generation algorithms 40 of such a digital identification item specifically envisaged for processing the parametric data obtained during the characterisation phase 26, said parametric data relating to the biometric data item.

Then, the checking step 20 comprises a validation sub-step 20 of the digital identification item generated in anticipation of the wearer identity check. This validation sub-step 28 comprises a comparison phase 29, implemented by the processing unit 2, between the digital identification item generated and the reference digital identification item. In this method, the reference digital identification item can be created, once the wearer has been duly authenticated and their identity is assured, during a definition step 11 of this reference digital identification item envisaging sub-steps similar to the acquisition 21 and generation 25 sub-steps implemented during the checking step 20. In this method, once the wearer of the watch 100 is authenticated, the processing unit 2 implements this definition step 11 and then archives the reference digital identification item obtained in the memory elements 6 of the processing unit 2. This reference digital identification item can therefore be determined automatically by the processing unit 2 or configured by the wearer during a setting process intended to guide the wearer in the definition of this reference digital identification element.

This comparison phase 29 comprises an access authorisation removal sub-phase 30 to said functions of the watch 100 if the digital identification item generated is substantially different or different from the reference digital identification item. In this scenario, the access to the functions of the watch 100 is then removed as the wearer and owner of the watch 100 may no longer be in possession thereof. As such in this context to use the functions of the watch 100 again, it is necessary to undergo authentication.

The comparison phase 29 also comprises an access authorisation retention sub-phase 31 to said functions of the watch 100 if the digital identification item generated is substantially similar or similar to the reference digital identification item. In this case, the checking unit 2 once again executes, according to the determined period, the sub-steps of acquisition 21 and generation 25 of the checking step 20 in order to carry out the comparison phase 29 once again.

Thus, the invention makes it possible to continuously automatically and non-intrusively check the identity of the wearer of the watch particularly once they are authenticated.

The invention also relates to a computer program comprising program code instructions for executing steps 10 to 31 of this method when said program is executed by the processing unit 2 of the watch 100.

The invention claimed is:

1. A method for securing access to a watch (100) including the following steps:
   authentication (10) of the wearer of the watch (100) with a view to authorising access to the functions of this watch (100) based on an interaction between the wearer of the watch and a graphic representation comprised in said watch (100), and
   periodic checking (20) of the identity of the wearer of the watch through a verification of the validity of at least one digital data item determined based on at least one biometric data item of the wearer of said watch with a view to retaining/removing the authorisation for access to said functions,
   wherein the at least one digital data item comprises a feature of a surface of a skin of the wearer and the feature is obtained from, of the skin, detecting hair and cracks of the surface at a skin portion at which the wearer wears the watch, wherein the periodic checking (20) further comprises verification of the validity of ones of the plurality of digital data items, comprising the cracks in the skin texture and the hair, by thermal imaging and detecting, from the thermal imaging, the cracks as warmer portions of the skin than other portions of the skin, wherein the periodic checking (20) further comprises an acquisition sub-step (21) by at least one multispectral biometric skin sensor (35) comprised in the watch (100), of a plurality of images of the skin portion of the skin adjacent to said sensor (35), said images comprising the at least one digital data item comprised in the skin portion, and wherein the multispectral biometric skin sensor (35) is configured to detect the cracks by contrasting a first image, of the images of the skin portion obtained by illuminating the skin portion at one or more of first wavelengths, with a second image, of the images of the skin portion obtained by illuminating the skin portion at one or more second wavelengths different than the first wavelengths, and detecting the cracks based on detecting shadows, apparent in one of the first image and the second image but not the other of the first image and the second image, by said contrasting the first image with the second image.

2. The method according to claim 1, further characterised in that the authentication step (10) further comprises a presentation sub-step (11) of a graphic representation (41) on a visual data broadcasting interface (3) of said watch (100).

3. The method according to claim 1, further characterised in that, the authentication step (10) further comprises a selection sub-step (14) within a limited time interval of a sequence of at least two identification portions of said graphic representation (41) aiming to identify said wearer, said sequence corresponding to an identification code of the wearer.

4. The method according to claim 3, further characterised in that the authentication step (10) further comprises a validation sub-step (16) of the selected sequence.

5. The method according to claim 1, further characterised in that the checking step (20) further comprises a generation sub-step (25) of a digital identification item based on the at least one digital data item.

6. The method according to claim 5, further characterised in that the checking step (20) further comprises a validation sub-step (28) of the digital identification item generated in anticipation of the wearer identity check.

7. The method according to claim 6, further characterised in that the validation sub-step (28) comprises a comparison phase (29) including an access authorisation retention sub-phase (30) to said functions of the watch if the digital identification item is substantially similar or similar to a reference digital identification item.

8. The method according to claim 7, further characterised in that the acquisition sub-step (21) further comprises an illumination phase (22) of the skin portion along different wavelengths, the different wavelengths comprising the first wavelengths and the second wavelengths.

9. The method according to claim 8, further characterised in that the acquisition sub-step (21) further comprises a capture phase (23) of images of the skin portion illuminated at different wavelengths.

10. The method according to claim 9, further characterised in that a generation sub-step (25) comprises a characterisation phase (26) of the at least one digital data item comprised in the acquired images relative to the skin portion.

11. The method according to claim 10, further characterised in that the generation sub-step (25) further comprises a design sub-step (27) of the digital identification item based on the characterisation of the at least one digital data item.

12. The method according to claim 11, further characterised in that the at least one digital data item relates to a texture of the skin at the skin portion.

13. A system for securing access to a watch (100) implementing the method according to claim 1, the system (1) comprising the following interconnected elements: a processing unit (2), a biometric sensor (35), an input interface (34) and a visual data broadcasting interface (3).

14. The system according to claim 13, further characterised in that the biometric sensor (34) is the multispectral biometric skin sensor.

15. A watch (100), particularly a connected mechanical watch (100), including a system (1) according to claim 13.

16. A non-transitory computer readable medium comprising program code instructions for executing the steps of the method according to claim 1 when said program is executed by a processing unit (2).

17. The method according to claim 1,
wherein the periodic checking (20) further comprises verification of the validity of a plurality of digital data items, including the at least one digital data item, and
wherein the plurality of digital data items comprise, from the skin portion at which the wearer wears the watch, the cracks in the skin texture at the surface of the skin and the hair from the surface of the skin.

* * * * *